(No Model.)
L. C. HARRISON.
HITCHING DEVICE.
No. 306,484. Patented Oct. 14, 1884.
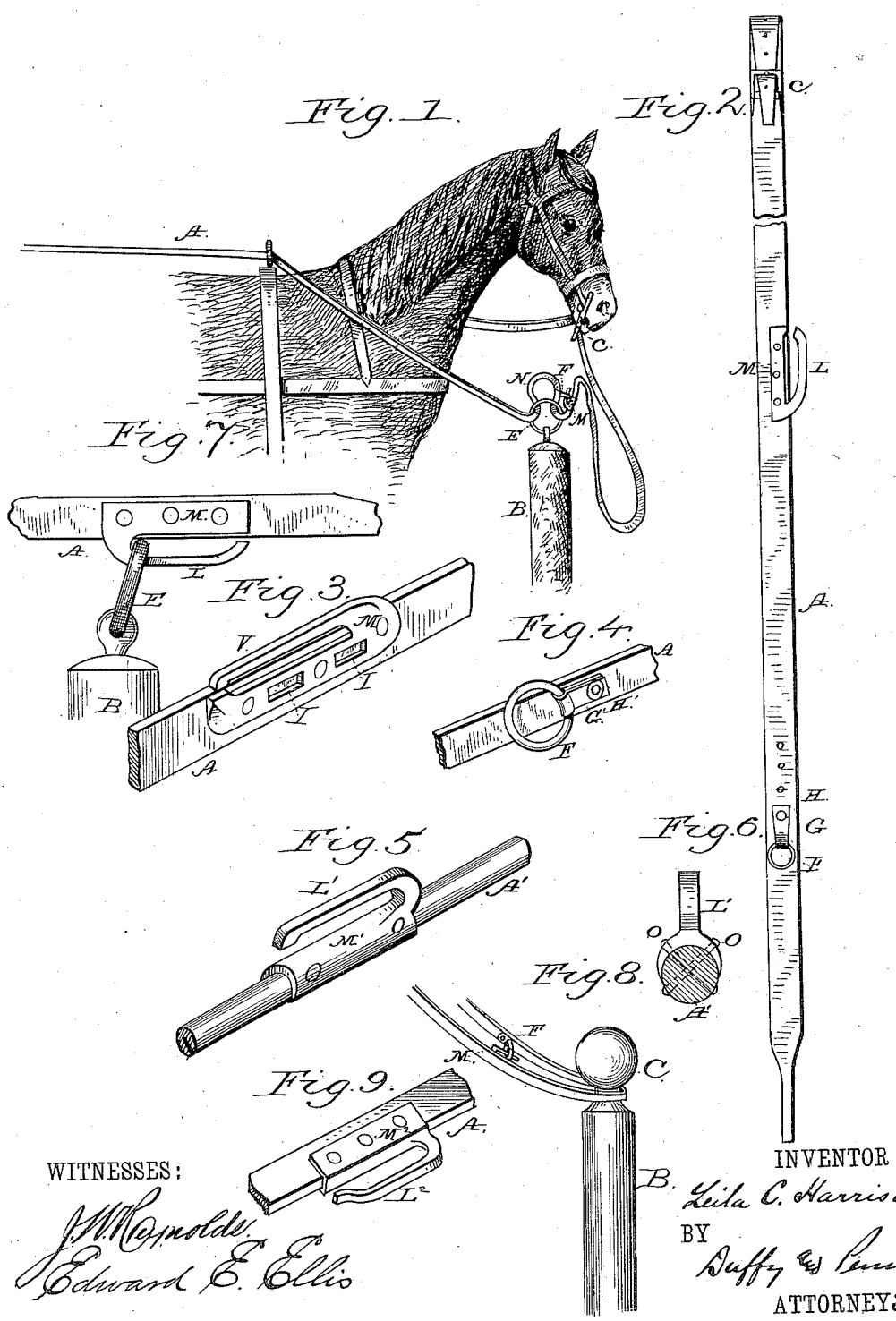
WITNESSES:
J. W. Reynolds
Edward E. Ellis
INVENTOR
Leila C. Harrison
BY
Duffy & Pennie
ATTORNEYS
N. PETERS, Photo-Lithographer, Washington, D. C.

UNITED STATES PATENT OFFICE.

LEILA C. HARRISON, OF NEW HAVEN, CONNECTICUT.

HITCHING DEVICE.

SPECIFICATION forming part of Letters Patent No. 306,484, dated October 14, 1884.

Application filed May 6, 1884. (No model.)

*To all whom it may concern:*

Be it known that I, LEILA C. HARRISON, of New Haven, in the county of New Haven and State of Connecticut, have invented certain new and useful Improvements in Detachable Horse-Hitching Devices; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to certain new and useful devices for detachably hitching horses to a stationary detaining post, ring, or other object; and it consists in such a construction and arrangement of parts that the act of detachment may be effected from the vehicle itself, and by a simple pull upon the driving-rein, whereas a pulling strain from the bridle end of the said rein shall have the tendency to bring the hitching device in operative position.

It is well known that horses generally are inclined to start as soon as unhitched, particularly when they have been left for some time secured and in harness, resulting in considerable inconvenience, and sometimes danger to the driver, especially if a lady; and the object of my invention is to produce a simple and easily applied and operated device, whereby a horse may be securely fastened to a stationary object and unhitched therefrom by the driver after he or she has become seated in the vehicle, whereby inconvenience is avoided, and expense and time saved.

Referring more particularly to the accompanying drawings, forming part of this specification, wherein like letters indicate like parts, Figure 1 represents a general view of my invention and shows its method of operation. Fig. 2 represents a plan view, partly broken away, of a driving-rein to which my fastening devices are attached. Fig. 3 represents in detail a perspective view, partly broken away, of a driving-rein to which is attached one of the constituents of my fastening device, the rein and fastener being shown, for convenience, in a reverse position. Fig. 4 represents a like view of the other constituent of my fastening device, showing a modification of the means of attaching the same to the driving-rein. Fig. 5 represents a like view showing a modification of the device shown in Fig. 3 as applied to a round driving-rein. Fig. 6 represents a rear sectional elevation of the same. Fig. 7 represents a side elevation showing a different mode of operation of my invention from that shown in Fig. 1. Fig. 8 represents in side elevation a modified disposition of the constituent parts of my invention with respect to the driving-rein. Fig. 9 represents in perspective a further modification of the device shown in Fig. 3.

A represents the driving-rein attached at its outer end, C, in the ordinary manner to a horse's bridle. At an appropriate distance from the bridle end, and generally intermediate between it and the turret-ring of the saddle, is arranged one of the constituent parts of my improved fastening device in the preferred form of its operation. The other part is arranged at a still farther distance from the bridle end, and generally so far behind it that when the rein is taut it will slip through the turret-ring. Either of the parts may be disposed in advance of the other, occupying the same relative position as the preferences of the user or the particular construction of the harness shall dictate. The arrangement preferred by me, however, is that shown in Figs. 1 and 2, wherein the fastener nearest the bridle end consists of a solid piece of metal, M, riveted or otherwise secured to the rein, and provided with a longitudinal slot whereby is formed a spring-arm projecting outwardly from the under edge of said rein, and in a direction substantially parallel thereto. The slot opens toward the bridle end, leaving a space of slightly less width than the thickness of the ring or other equivalent counterpart, which in the operation of my invention is designed to pass through it, completing the fastening.

The other constituent of my device consists, preferably, of a ring, F, attached by a strip, G, of suitable material, and by a loosely-turning rivet, H, to the part of the rein nearer the driver. In the operation of my invention, with this arrangement of parts the part of the rein immediately to the rear of the ring F is looped, as shown in Fig. 1, and passed, together with the ring, through the ring E of a retaining or hitching post, B. The ring F is then forced through the opening of the hooked piece M, and rests in the slot contained between the main body of said hooked piece and the spring-arm L. The parts being so disposed, a pulling-strain from the bridle end of the rein would have the tendency to force the ring F into the angle formed by the joinder of the arm L with the main body M. The pulling-strain would therefore be transmitted to the hitching-ring E, the attachment being firmly and securely established. When it is desired to disconnect the fastening, this may be conveniently and expeditiously effected from the driver's seat by pulling upon the inner end of the rein. The loop N is thereby readily drawn through the ring E, carrying with it the ring F, which, sliding along the arm L, is by a slight pull carried through the opening between said arm and the piece M, thereby disconnecting the fastening and freeing the rein from the hitching-ring.

It is evident that the connection between the ring F and the spring-piece M may with equal facility be established and disestablished around any other detaining device than the hitching-ring shown in Fig. 1. Thus that portion of the rein included between the ring and spring-hook may be passed around an upright post or tree and the connection be made in the same manner as above described. In order to accommodate the fastener to posts and trees of various thicknesses it will be desirable in some cases to make one or the other of its constituent parts adjustable along the length of the driving-rein. This may be done, for instance, by attaching the ring F to an ordinary buckle whose tongue is adapted to engage in a series of perforations arranged at various distances along the rein; or as a substitute to the ring and its mode of attachment, as illustrated, a split ring may be provided adapted to be forced through and removed from any of these perforations.

As shown at Fig. 8, the relative positions of the ring and hook with respect to each other may be reversed, the hook M being in that case nearest the inner end of the driving-rein, and the ring F nearest the bridle end thereof. The mode of fastening of this device is sufficiently obvious from the drawings. In some instances, moreover, I may dispense entirely with the ring F, fixed upon the rein, and, as shown in Fig. 7, force the ring E of the hitching-post B directly through the opening between the arm L and the main piece M of the spring hook. In such instances the spring-hook is withdrawn from the hitching-ring by a pull from the driver's end, as above described. It will be evident, however, that this mode of fastening is only possible where the hitching-ring happens to be of just the appropriate thickness, involving a more limited application thereof than in forms already described.

Various modifications may be made in the specific construction of the fastening devices themselves and their mode of attachment to the driving-rein. Thus, as shown in Fig. 3, the main body M may be cut away at I I, or otherwise, in order to save metal. The outer edges should also preferably be rounded off, as shown therein, in order to prevent the catching of the device upon other parts of the harness. The main body of the spring-hook may also be internally slotted, as shown in Fig. 9, forming cheek-pieces $M^2$, between which the edge of the rein passes, and within which it is secured by rivets or otherwise. In this case the spring-arm $L^2$ will lie in the same plane with the flat part of the rein.

In Figs. 5 and 6 the form of the spring-hook is altered to adapt it to be secured to a round rein, A', the main body M', carrying the spring-arm L', being longitudinally grooved to correspond with the curvature of the rein, to which it is attached by rivets O O, or to which, if desired, it may be sewed.

As represented in Fig. 4, the ring F may be attached to a metallic strap, G', which in turn may be swiveled to the driving-rein by a headed turn-rivet, H'.

It will be evident that instead of attaching the spring-hook M and ring F directly to the driving-rein, they may be attached in the same relative positions to an auxiliary hitching-strap connected at one end to the bridle and at the other to the rein, so that such strap in like manner may be operated from the driver's end of the rein. While the end nearest the bridle is slack, as shown in Fig. 1, the ring F, by reason of its greater thickness, is prevented from being shaken out of the opening in the piece M.

Instead of the spring-arm L L' L'' being integral with the piece M M' M'', it may be a separate spring, occupying the same relative position, attached at one extremity to M and at its other extremity bearing against or in close proximity to the latter.

Having thus described my invention, what I claim, and desire to secure by Letters Patent, is—

1. The combination, with a driving-rein or other strap attached thereto, of a hooked piece consisting of a base-plate and spring-arm rigidly attached to said rein or strap and opening toward the bridle or headstall end thereof, substantially as described.

2. The combination, with a driving-rein or other strap attached thereto, of a hooked piece consisting of a base-plate and spring-arm rigidly attached to said rein or strap and opening toward the bridle or headstall end thereof, and a ring, also attached to said rein or strap at a point along its length removed from the point of attachment of the hooked piece, substantially as described.

3. In a hitching device, a hooked piece consisting of a base-plate of metal and a spring-tongue lying in the same plane and integral therewith, whereby a longitudinal opening is formed between the adjacent edges of said plate and tongue, the free end of the tongue being at a lesser distance from the plate than the width of the opening, substantially as described.

In testimony that I claim the foregoing as my own I affix my signature in presence of two witnesses.

LEILA C. HARRISON.

Witnesses:
  O. E. DUFFY,
  EDWARD E. ELLIS.